(12) United States Patent
Jiang et al.

(10) Patent No.: US 10,368,051 B2
(45) Date of Patent: Jul. 30, 2019

(54) 3D-HEVC INTER-FRAME INFORMATION HIDING METHOD BASED ON VISUAL PERCEPTION

(71) Applicant: Ningbo University, Ningbo, Zhejiang (CN)

(72) Inventors: Gangyi Jiang, Zhejiang (CN); Jing Wang, Zhejiang (CN); Fen Chen, Zhejiang (CN); Yongqiang Bai, Zhejiang (CN); Yang Wang, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 48 days.

(21) Appl. No.: 15/687,276

(22) Filed: Aug. 25, 2017

(65) Prior Publication Data
US 2017/0374347 A1  Dec. 28, 2017

(30) Foreign Application Priority Data
Mar. 30, 2017 (CN) .......................... 2017 1 0202076

(51) Int. Cl.
*H04N 13/00* (2018.01)
*H04N 13/161* (2018.01)
(Continued)

(52) U.S. Cl.
CPC .......... *H04N 13/161* (2018.05); *H04N 13/15* (2018.05); *H04N 19/124* (2014.11);
(Continued)

(58) Field of Classification Search
CPC .. H04N 19/159; H04N 19/117; H04N 19/105; H04N 19/176; H04N 19/61;
(Continued)

(56) References Cited

U.S. PATENT DOCUMENTS

| 8,682,108 B2 * | 3/2014 | Tian ..................... G06K 9/3233 |
| | | 382/294 |
| 8,953,044 B2 * | 2/2015 | Wu ........................ G08G 1/054 |
| | | 348/143 |

(Continued)

*Primary Examiner* — Frank F Huang

(57) ABSTRACT

A 3D-HEVC inter-frame information hiding method based on visual perception includes steps of information embedding and information extraction. In the step of information embedding, the human visual perception characteristic is considered, stereo salient images are obtained by a stereo image salient model, and the stereo salient images are divided into salient blocks and non-salient blocks with an otsu threshold. The coding quantization parameters are modified according to different modulation rules for different regions. Then, based on the modified quantization parameters, the coding-tree-units are coded to complete the information embedding. In the step of information extraction, no original video is needed, no any side information needs to be transmitted, and the secret information can be blindly extracted. The present invention combines with the human visual perception characteristic, and selects P frames and B frames as embedded frames for effectively reducing the decrease of the stereo video subjective quality.

4 Claims, 2 Drawing Sheets

(51) Int. Cl.
*H04N 13/15* (2018.01)
*H04N 19/124* (2014.01)
*H04N 19/172* (2014.01)
*H04N 19/176* (2014.01)
*H04N 19/182* (2014.01)
*H04N 19/467* (2014.01)
*H04N 19/597* (2014.01)
*H04N 19/136* (2014.01)
*H04N 19/154* (2014.01)
*H04N 19/132* (2014.01)

(52) U.S. Cl.
CPC ......... *H04N 19/136* (2014.11); *H04N 19/154* (2014.11); *H04N 19/172* (2014.11); *H04N 19/176* (2014.11); *H04N 19/182* (2014.11); *H04N 19/467* (2014.11); *H04N 19/597* (2014.11); *H04N 19/132* (2014.11)

(58) Field of Classification Search
CPC .. H04N 19/187; H04N 19/467; H04N 19/174; H04N 19/70; H04N 19/102; H04N 19/18
See application file for complete search history.

(56) References Cited

U.S. PATENT DOCUMENTS

| | | | |
|---|---|---|---|
| 8,971,532 B1* | 3/2015 | Milstein | H04N 21/4627 380/201 |
| 9,270,299 B2* | 2/2016 | Luby | H03M 13/3761 |
| 9,367,746 B2* | 6/2016 | Ishihara | G06K 9/00724 |
| 9,445,114 B2* | 9/2016 | Ouedraogo | H04N 19/70 |
| 10,104,379 B2* | 10/2018 | Filippov | H04N 19/176 |
| 2011/0268194 A1* | 11/2011 | Nagano | H04N 21/234363 375/240.25 |
| 2012/0020413 A1* | 1/2012 | Chen | H04N 19/597 375/240.26 |
| 2012/0033039 A1* | 2/2012 | Sasaki | H04N 19/597 348/43 |

* cited by examiner

3D-HEVC INTER-FRAME INFORMATION HIDING METHOD BASED ON VISUAL PERCEPTION

CROSS REFERENCE OF RELATED APPLICATION

The present invention claims priority under 35 U.S.C. 119(a-d) to CN 201710202076.6, filed Mar. 30, 2017.

BACKGROUND OF THE PRESENT INVENTION

Field of Invention

The present invention relates to a video information hiding technology, and more particularly to a 3D-HEVC inter-frame information hiding method based on visual perception.

Description of Related Arts

The three dimensional (3D) video can give users a new visual impact and has aroused widespread concern. With the maturity of the internet technology, the 3D video can be easily handled illegally, so that the security of the 3D video has become a major problem restricting the commercialization of 3D products. The information hiding technology can effectively accomplish the secret communication and copyright judgment of multimedia data, so it can better solve the information security problem in the video coding transmission. The 3D video has a large amount of data, so it needs to be efficiently compressed so as to save the transmission bandwidth and storage space. JCT-3V, composed of ITU-T Video Coding Experts Group and ISO/IEC Motion Picture Experts Group, is dedicated to the study of 3D-HEVC (3D High Efficiency Video Coding) coding standard. Therefore, the study on the 3D video information hiding technology based on 3D-HEVC standard is a subject with both academic and application value.

At present, the study on the 3D video information hiding technology still has a big problem. In accordance with the embedded location, the 3D video information hiding technology can be divided into the hidden algorithm of the original domain and the hidden algorithm of the compressed domain. The hidden algorithm of the original domain is defined as embedding the secret information in the original video which is not coded and compressed. For example, YANG et al. proposed a 3D video blind watermarking algorithm based on quantized index modulation, which embeds the watermarking information into the DCT coefficients of the depth video. This algorithm has a strong robustness and the color video is not distorted. The 3D video needs to be coded and transmitted, the hidden algorithm of the original domain cannot be directly applied to the compressed domain, otherwise it will cause the loss of the secret information. The existing 3D video information hiding technology of the compressed domain is mainly based on the 3D video coding standard expansion of H.264. For example, SONG et al. proposed a reversible multi-view video information hiding algorithm, which through introducing the idea of the inner product, the information hiding is carried out on the motion vector of the b4 frame coding block. This method has better imperceptibility and can realize the information reversibility. The compression performance of the 3D-HEVC coding standard is significantly better than that of the 3D video coding standard expansion based on H.264, and is adapted for the coding of the more high-definition video sequence, so the study on the 3D video information hiding algorithm based on the 3D-HEVC coding standard is necessary. At present, the embedded vectors selected by video information hiding technology are mainly intra prediction modes, DCT coefficients, motion vectors and so on. These common embedded vectors are vulnerable to illegal attacks, which undoubtedly reduces the security of the video information hiding technology. At the same time, due to different attentions of the human eye on different areas of a same video, the more concerned region can tolerate less distortion, the less concerned region can tolerate greater distortion, and the existing inter-frame information hiding algorithm just simply uses the secret information to modulate the video coding parameters, does not consider the perception characteristic of the human visual system (HVS), and is unable to improve the algorithm performance to the maximum. Therefore, it needs to research a 3D-HEVC inter-frame information hiding method based on visual perception.

SUMMARY OF THE PRESENT INVENTION

A technical problem to be solved of the present invention is to provide a 3D-HEVC inter-frame information hiding method based on visual perception, which combines with human visual perception characteristic and uses P frames and B frames as embedded frames for effectively reducing the decrease of the stereoscopic video subjective quality, is low in computational complexity, has small impact on bit rate, and can achieve blind extraction.

A technical solution adopted by the present invention to solve the above technical problem is as follows. A 3D-HEVC inter-frame information hiding method based on visual perception comprises steps of information embedding and information extraction, wherein:

the step of information embedding comprises:

(1A) at an information embedding terminal, taking $S_{org}$ as an original stereo video, recording a left view color video of the $S_{org}$ as $L_{org}$, recording a right view color video of the $S_{org}$ as $R_{org}$, and taking W as secret information to be embedded, wherein: W is a binary number which contains $n_W$ bits, $W = w_{n_W} w_{n_W-1} \ldots w_i \ldots w_2 w_1$, a width of both a left view color image of the $L_{org}$ and a right view color image of the $R_{org}$ is M, a height thereof is N, both the M and the N can be divisible by 64, a total frame number of both all left view color images of the $L_{org}$ and all right view color images of the $R_{org}$ is F, here, F≥1, $n_W$ is a integer and $$n_W \in \left[2, \frac{2 \times M \times N \times F}{64 \times 64}\right],$$

$w_{n_W} w_{n_W-1} \ldots w_i \ldots w_2 w_1$ respectively represent a value of a $(n_W)^{th}$ bit, a value of a $(n_W-1)^{th}$ bit, ..., a value of an $i^{th}$ bit, ..., a value of a second bit and a value of a first bit, each of the $w_{n_W} w_{n_W-1} \ldots w_i \ldots w_2 w_1$ is 0 or 1, $1 \leq i \leq n_W$;

(1B) obtaining a stereo saliency image of each left view color image of the $L_{org}$ through a stereo image saliency model, recording a stereo saliency image of a $j^{th}$ left view color image of the $L_{org}$ as $L_{org,j}^u$, calculating an otsu threshold of the stereo saliency image of each left view color image of the $L_{org}$, and recording the otsu threshold of the $L_{org,j}^u$ as $y_j^L$, wherein $1 \leq j \leq F$, also, obtaining a stereo saliency image of each right view color image of the $R_{org}$ through the stereo image saliency model, recording a stereo saliency image of a $j^{th}$ right view color image of the $R_{org}$ as $R_{org,j}^u$, calculating an otsu threshold of the stereo saliency image of each right view color image of the $R_{org}$, and recording the otsu threshold of the $R_{org,j}^u$ as $y_j^R$;

(1C) dividing the stereo saliency image of each left view color image of the $L_{org}$ into non-overlapped $$\left(\frac{M}{64} \times \frac{N}{64}\right)$$

image blocks each of which has a size of 64×64, recording a $k^{th}$ image block of the $L_{org,j}^u$ as $B_{org,j,k}^L$, calculating a mean value of pixel values of all pixels of each image block of the stereo saliency image of each left view color image of the $L_{org}$ recording the mean value of the pixel values of all the pixels of the $B_{org,j,k}^L$ as $q_{j,k}^L$, determining whether each image block of the stereo saliency image of each left view color image of the $L_{org}$ is a salient block or a non-salient block according to the mean value of the pixel values of all the pixels of each image block of the stereo saliency image of each left view color image of the $L_{org}$ and the otsu threshold of the stereo saliency image of each left view color image of the $L_{org}$, wherein: if the $q_{j,k}^L$ is larger than or equal to the $y_j^L$, the $B_{org,j,k}^L$ is determined to be the salient block, if the $q_{j,k}^L$ is smaller than the $y_j^L$, the $B_{org,j,k}^L$ is determined to be the non-salient block, here, $$1 \le k \le \frac{M}{64} \times \frac{N}{64},$$

also, dividing the stereo saliency image of each right view color image of the $R_{org}$ into non-overlapped $$\left(\frac{M}{64} \times \frac{N}{64}\right)$$

image blocks each of which has a size of 64×64, recording a $k^{th}$ image block of the $R_{org,j}^u$ as $B_{org,j,k}^R$, calculating a mean value of pixel values of all pixels of each image block of the stereo saliency image of each right view color image of the $R_{org}$, recording the mean value of the pixel values of all the pixels of the $B_{org,j,k}^R$ as $q_{j,k}^R$, determining whether each image block of the stereo saliency image of each right view color image of the $R_{org}$ is a salient block or a non-salient block according to the mean value of the pixel values of all the pixels of each image block of the stereo saliency image of each right view color image of the $R_{org}$ and the otsu threshold of the stereo saliency image of each right view color image of the $R_{org}$, wherein: if the $q_{j,k}^R$ is larger than or equal to the $y_j^R$, the $B_{org,j,k}^R$ is determined to be the salient block, if the $q_{j,k}^R$ is smaller than the $y_j^R$, the $B_{org,j,k}^R$ is determined to be the non-salient block;

(1D) generating a binary pseudorandom sequence which contains $n_W$ bits through logistics chaotic mapping, taking the binary pseudorandom sequence as a secret key and recording the secret key as E, here, $E = e_{n_W} e_{n_W-1} \ldots e_i \ldots e_2 e_1$, perform an XOR (exclusive OR) operation on a value of each bit of the W and a value of each corresponding bit of the E, obtaining an XOR result, taking the XOR result as encrypted information and recording the encrypted information as W', here, $W' = w'_{n_W} w'_{n_W-1} \ldots w'_i \ldots w'_2 w'_1$, wherein: the $e_{n_W} e_{n_W-1} \ldots e_i \ldots e_2 e_1$ respectively represent a value of the $(n_W)^{th}$ bit, a value of the $(n_W-1)^{th}$ bit, . . . , a value of the $(i)^{th}$ bit, . . . a value of the second bit and a value of the first bit of the E, each of the $e_{n_W} e_{n_W-1} \ldots e_i \ldots e_2 e_1$ is 0 or 1, $w'_{n_W} w'_{n_W-1} \ldots w'_i \ldots w'_2 w'_1$ respectively represent a value of the $(n_W)^{th}$ bit, a value of the $(n_W-1)^{th}$ bit, . . . , a value of the $(i)^{th}$ a value of the second bit and a value of the first bit of the W', each of the $w'_{n_W} w'_{n_W-1} \ldots w'_i \ldots w'_2 w'_1$ is 0 or 1, $w'_i$ is an XOR value of the $w_i$ and the $e_i$;

(1E) coding the $L_{org}$ and the $R_{org}$ in frame through a 3D-HEVC standard coding platform, defining a $j^{th}$ left view color image of the $L_{org}$ to be coded or a $j^{th}$ right view color image of the $R_{org}$ to be coded as a current frame and recording the current frame as $P_j$, wherein an initial value of the j is 1;

(1F) judging whether the $P_j$ is a P-frame or a B-frame, wherein if it is, step (1G) is executed, if it is not, step (1I) is executed;

(1G) coding the $P_j$ in coding-tree-unit, defining a $k^{th}$ coding-tree-unit to be coded of the $P_j$ as a current coding block and recording the current coding block as $B_{org,j,k}$, wherein $$1 \le k \le \frac{M}{64} \times \frac{N}{64},$$

here an initial value of the k is 1;

(1H-a) reading coding quantization parameter of the $B_{org,j,k}$ and recording the coding quantization parameter as $QP_{org,j,k}$, reading a value $w'_{i'}$ of a $i'^{th}$ bit of the W' and a value $w'_{i'+1}$ of a $(i'+1)^{th}$ bit of the W', transforming the $w'_{i'+1}$ and the $w'_{i'}$ into decimal value and recording the decimal values as $d_{i'}$, here, $$d_{i'} = \begin{cases} 0 & w'_{i'+1} w'_{i'} = 00 \\ 1 & w'_{i'+1} w'_{i'} = 01 \\ 2 & w'_{i'+1} w'_{i'} = 10 \\ 3 & w'_{i'+1} w'_{i'} = 11 \end{cases},$$

wherein an initial value of the i' is $1 \le i' \le n_W - 1$, and each of $w'_{i'}$ and $w'_{i'+1}$ is 0 or 1;

(1H-b) when the $P_j$ is the $j^{th}$ left view color image of the $L_{org}$, judging whether a remainder result of the $QP_{org,j,k}$ to 4 is equal to the $d_{i'}$, wherein if the remainder result is not equal to the $d_{i'}$, when the $B_{org,j,k}^L$ is a salient block, the $QP_{org,j,k}$ is downwardly modulated by the $w'_{i'}$ and the $w'_{i'+1}$, so that coding quantization parameter embedded with secret information of the $B_{org,j,k}^L$ is obtained and recorded as $QP'_{org,j,k}$, and then step (1H-c) is executed; when the $B_{org,j,k}^L$ is a non-salient block, the $QP_{org,j,k}$ is upwardly modulated by the $w'_{i'}$ and the $w'_{i'+1}$, so that the coding quantization parameter embedded with secret information of the $B_{org,j,k}$ is obtained and recorded as the $QP'_{org,j,k}$, and then the step (1H-c) is executed; if the remainder result is equal to the $d_{i'}$, the $QP_{org,j,k}$ is directly recorded as the coding quantization parameter embedded with secret information of the $B_{org,j,k}$ which is denoted as the $QP'_{org,j,k}$, $QP'_{org,j,k} = QP_{org,j,k}$, and then the step (1H-c) is executed, here, "=" is an assignment symbol in the $QP'_{org,j,k} = QP_{org,j,k}$;

when the $P_j$ is the $j^{th}$ right view color image of the $R_{org}$, judging whether a remainder result of the $QP_{org,j,k}$ to 4 is equal to the $d_{i'}$, wherein if the remainder result is not equal to the $d_{i'}$, when the $B_{org,j,k}^R$ is a salient block, the $QP_{org,j,k}$ downwardly modulated by the $w'_{i'}$ and the $w'_{i'+1}$, so that coding quantization parameter embedded with secret information of the $B_{org,j,k}$ is obtained and recorded as $QP'_{org,j,k}$, and then the step (1H-c) is executed; when the $B_{org,j,k}^R$ is a non-salient block, the $QP_{org,j,k}$ upwardly modulated by the $w'_{i'}$ and the $w'_{i'+1}$, so that the coding quantization parameter embedded with secret information of the $B_{org,j,k}$ is obtained and recorded as the $QP'_{org,j,k}$, and then the step (1H-c) is executed; if the remainder result is equal to the $d_{i'}$, the $QP_{org,j,k}$ is directly recorded as the coding quantization parameter embedded with secret information of the $B_{org,j,k}$ which is denoted as the $QP'_{org,j,k}$, $QP'_{org,j,k}=QP_{org,j,k}$, and then the step (1H-c) is executed;

(1H-c) judging whether the $QP'_{org,j,k}$ is in a range of [0, 51], wherein if it is, step (1H-d) is executed; otherwise, when $QP'_{org,j,k}>51$, the $QP_{org,j,k}$ is downwardly modulated by the $w'_{i'}$ and the $w'_{i'+1}$ the coding quantization parameter embedded with secret information $QP'_{org,j,k}$ of the $B_{org,j,k}$ is obtained again, and then the step (1H-d) is executed; when $QP'_{org,j,k}<0$, the $QP_{org,j,k}$ is modulated the $w'_{i'}$, and the $w'_{i'+1}$, the coding quantization parameter embedded with secret information $QP'_{org,j,k}$ of the $B_{org,j,k}$ is obtained again, and then the step (1H-d) is executed;

(1H-d) coding the $B_{org,j,k}$ with the $QP'_{org,j,k}$, completing a secret information embedded process of the $B_{org,j,k}$ after completing coding of the $B_{org,j,k}$, judging whether the $B_{org,j,k}$ is a skip block, wherein if it is, step (1H-e) is directly executed, otherwise, i'=i'+2 is set, the step (1H-e) is executed, here, "=" is an assignment symbol in the i'=i'+2;

(1H-e) setting k=k+1, regarding a next coding-tree-unit to be coded of the $P_j$ as a current coding block and recording the next coding-tree-unit to be coded as $B_{org,j,k}$, returning to the step (1H-a) to continue till all coding-tree-units of the $P_j$ are completely coded, executing step (1I), wherein "=" is an assignment symbol in the k=k+1;

(1I) setting j=j+1, regarding a next left view color image to be coded of the $L_{org}$ or a next right view color image to be coded of the $R_{org}$ as a current frame and recording the current frame as $P_j$, returning to the step (1F) and continuing till all left view color images in the $L_{org}$ and all right view color images in the $R_{org}$ are completely coded, and obtaining video stream embedded with secret information, wherein "=" is an assignment symbol in the j=j+1; and (1J) sending initial value information which generates the secret key E to an information extraction terminal.

The step of information extraction comprises:

(2A) defining the video stream embedded with secret information received at an information extraction terminal as a target video stream and recording the target video stream as $str.bin_{dec}$;

(2B) according to the initial value information which generates the secret key E sent from an information embedding terminal, through the logistics chaotic mapping, generating a secret key E which is same as that of the information embedding terminal;

(2C) parsing the $str.bin_{dec}$ frame by frame, and defining a frame to be parsed in the $str.bin_{dec}$ as a current frame;

(2D) judging the current frame is a P-frame or B-frame, wherein if it is, step (2E) is executed, otherwise, step (2H) is executed;

(2E) parsing the current frame coding-tree-unit by coding-tree-unit, and defining a coding-tree-unit to be parsed in the current frame as a current parsing block;

(2F) judging whether the current parsing block is a skip block, wherein if it is, step (2G) is executed, otherwise, coding quantization parameter embedded with secret information of the current parsing block are parsed and recorded as $QP'_{dec}$, and then a remainder result of $QP'_{dec}$ to 4 is calculated and recorded as $d'_{dec}$, wherein the $d'_{dec}$ is 0, 1, 2 or 3, and then the decimal $d'_{dec}$ is transformed to binary number, values of two bits extracted from the current parsing block are obtained, such that a secret information extraction process of the current parsing block is completed, and then the step (2G) is executed;

(2G) regarding a next coding-tree-unit to be parsed of the current frame as a current parsing block, and then returning to the step (2F) till all coding-tree-units of the current frame are completely processed, and then step (2H) is executed;

(2H) regarding a next frame to be parsed of the $str.bin_{dec}$ as a current frame, and then returning to the step (2D) till all frames of the $str.bin_{dec}$ are completely processed, such that secret information extraction is completed; and (2I) defining extracted values of $n_W$ bits as encrypted information and recording the encrypted information as $W'_{dec}$, here, $W'_{dec}=w'_{dec,n_W} w'_{dec,n_W-1} \ldots w'_{dec,i} \ldots w'_{dec,2} w'_{dec,1}$, and then perform an XOR (exclusive OR) operation on a value of each bit of the $W_{dec}$ and a value of each corresponding bit of the E, obtaining an XOR result, taking the XOR result as decrypt secret information and recording the decrypt secret information as $W_{dec}$ here, $W_{dec}=w_{dec,n_W} w_{dec,n_W-1} \ldots w_{dec,i} \ldots w_{dec,2} w_{dec,1}$ wherein: the $w'_{dec,n_W} w'_{dec,n_W-1} \ldots w'_{dec,i} \ldots w'_{dec,2} w'_{dec,1}$ respectively represent a value of the $(n_W)^{th}$ bit, a value of the $(n_W-1)^{th}$ bit, ..., a value of the $(i)^{th}$ bit, ... a value of the second bit and a value of the first bit of the $W'_{dec}$, each of the $w'_{dec,n_W} w'_{dec,n_W-1} \ldots w'_{dec,i} \ldots w'_{dec,2} w'_{dec,1}$ is 0 or 1, $w_{dec,n_W} w_{dec,n_W-1} \ldots w_{dec,i} \ldots w_{dec,2} w_{dec,1}$ respectively represent a value of the $(n_W)^{th}$ bit, a value of the $(n_W-1)^{th}$ bit, ..., a value of the $(i)^{th}$ bit, ... a value of the second bit and a value of the first bit of the $W_{dec}$, each of the $w_{dec,n_W} w_{dec,n_W-1} \ldots w_{dec,i} \ldots w_{dec,2} w_{dec,1}$ is 0 or 1.

In the step (1H-b) of the method, through the $w'_{i'}$ and the $w'_{i'+1}$, the $QP_{org,j,k}$ is downwardly modulated to obtain the $QP'_{org,j,k}$, which is specifically embodied as: (b1) finding out all values in an interval of $[-3,QP_{org,j,k}]$ which meet a condition that a remainder result of an absolute value of each of all the values to 4 is equal to $d_{i'}$; (b2) calculating an absolute value of a difference value of each of all the values found out in the step (b1) and the $QP_{org,j,k}$; and (b3) finding out a minimum absolute value of all absolute values calculated in the step (b2), and assigning a value found out in the step (b1), which is corresponding to the minimum absolute value, to the $QP'_{org,j,k}$.

In the step (1H-b) of the method, through the $w'_{i'}$ and the $w'_{i'+1}$, the $QP_{org,j,k}$ is upwardly modulated to obtain the $QP'_{org,j,k}$, which is specifically embodied as: (b1') finding out all values in an interval of $[QP_{org,j,k},54]$ which meet a condition that a remainder result of an absolute value of each of all the values to 4 is equal to $d_{i'}$; (b2') calculating an absolute value of a difference value of each of all the values found out in the step (b1') and the $QP_{org,j,k}$; and (b3') finding out a minimum absolute value of all absolute values calculated in the step (b2'), and assigning a value found out in the step (b1'), which is corresponding to the minimum absolute value, to the $QP'_{org,j,k}$.

In the step (1H-c) of the method, through the $w'_{i'}$ and the $w'_{i'+1}$, the $QP_{org,j,k}$ is downwardly modulated to regain the $QP'_{org,j,k}$, which is specifically embodied as: (c1) finding out all values in an interval of $[0,QP_{org,j,k}]$ which meet a condition that a remainder result of an absolute value of each of all the values to 4 is equal to $d_{i'}$; (c2) calculating an absolute value of a difference value of each of all the values found out in the step (c1) and the $QP_{org,j,k}$; and (c3) finding out a minimum absolute value of all absolute values calculated in the step (c2), and assigning a value found out in the step (c1), which is corresponding to the minimum absolute value, to the $QP'_{org,j,k}$.

In the step (1H-c) of the method, through the $w'_i$, and the $w'_{i+1}$, the $QP_{org,j,k}$ is upwardly modulated to regain the $QP'_{org,j,k}$, which is specifically embodied as: (c1') finding out all values in an interval of $[QP_{org,j,k},51]$ which meet a condition that a remainder result of an absolute value of each of all the values to 4 is equal to $d_i$; (c2') calculating an absolute value of a difference value of each of all the values found out in the step (c1') and the $QP_{org,j,k}$; and (c3') finding out a minimum absolute value of all absolute values calculated in the step (c2'), and assigning a value found out in the step (c1'), which is corresponding to the minimum absolute value, to the $QP_{org,j,k}$.

Compared with the prior art, the present invention has advantages as follows.

(1) When the present invention hides information in the 3D-HEVC compressed domain, the human visual perception characteristic is combined; the secret information is embedded under the guidance of stereo saliency images, more bit rates are distributed in salient areas, less bit rates are distributed in non-salient areas, thus improving the performance of the algorithm without obviously destroying human eye viewing effects.

(2) The present invention is a stereo video information hiding method for inter-frames, and takes P-frames and B-frames as embedded frames to embed the secret information, which has little effect on the subjective quality of stereoscopic videos.

(3) The present invention is different from the traditional video information hiding methods which embed the secret information in the intra-frames, the DCT coefficients or the motion vectors. The embedding vector selected by the present invention is a coding quantization parameter, the secret information is embedded into the coding quantization parameter before coding, and then the coding quantization parameter embedded with the secret information is used to encode the stereo video, so that no re-coding process is required, the phenomenon of error drift is avoided, and the computational complexity is low.

(4) The present invention builds the mapping relation between the secret information and the coding quantization parameter, and utilizes the secret information to module the coding quantization parameter. Therefore, this modulation method is more flexible.

(5) The present invention does not need the participation of the original video in the information extraction part and does not need to transmit any side information, the secret information can be blindly and easily extracted.

DETAILED DESCRIPTION OF THE PREFERRED EMBODIMENT

The present invention is further explained in detail with accompanying with drawings and embodiments.

Figures 1A, 1B:
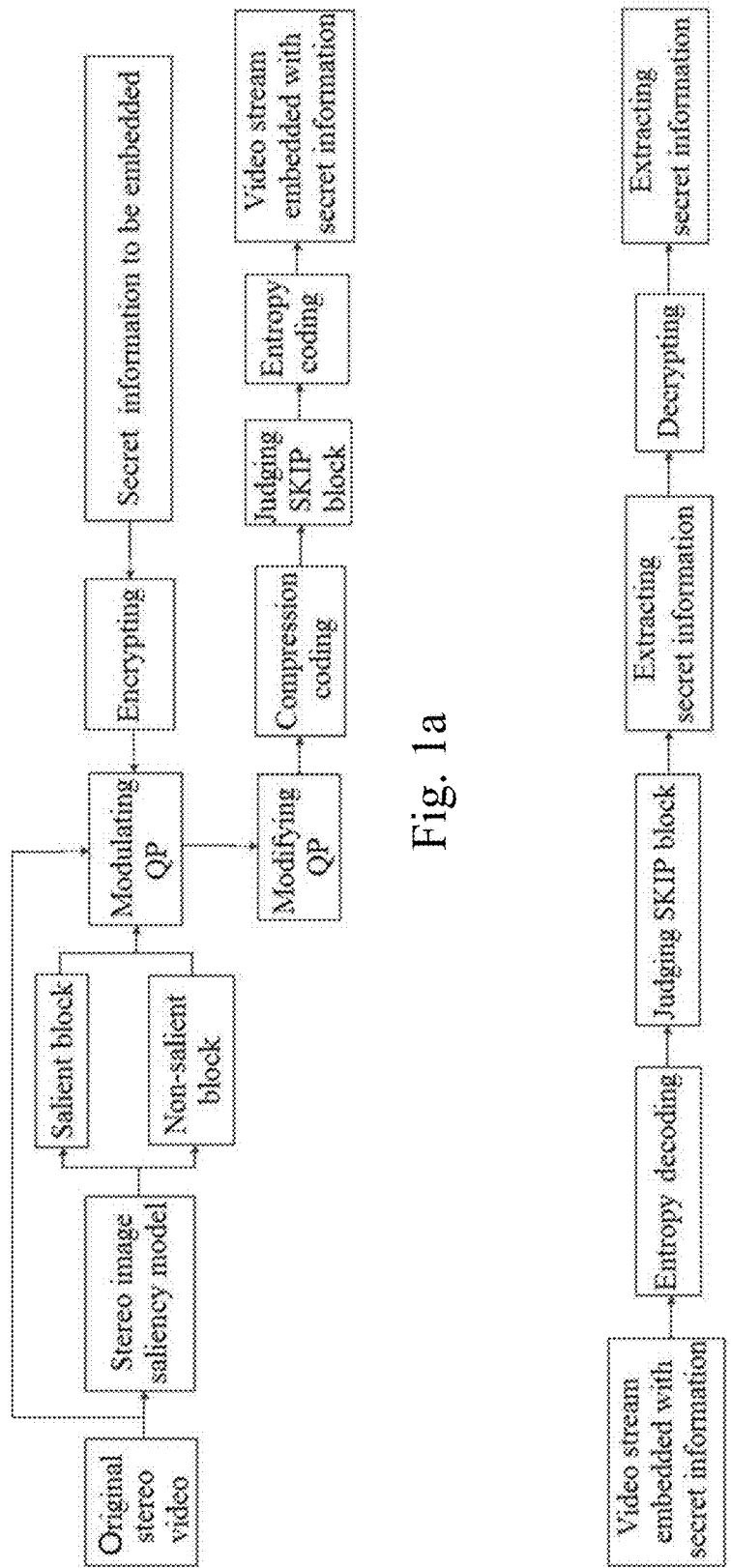
FIG. 1a is a general block diagram of an information embedding step of a method provided by the present invention.
FIG. 1b is a general block diagram of an information extraction step of the method provided by the present invention.

A 3D-HEVC inter-frame information hiding method based on visual perception, provided by the present invention, comprises steps of information embedding and information extraction, wherein FIG. 1a shows a general block diagram of the step of information embedding which is specifically embodied as:

(1A) at an information embedding terminal (for example an encoder of stereo video signal), taking $S_{org}$ as an original stereo video, recording a left view color video of the $S_{org}$ as $L_{org}$, recording a right view color video of the $S_{org}$ as $R_{org}$, and taking W as secret information to be embedded, wherein: W is a binary number which contains bits, $W=w_{n_W} w_{n_W-1} \ldots w_i \ldots w_2 w_1$, a width of both a left view color image of the $L_{org}$ and a right view color image of the $R_{org}$ is M, a height thereof is N, both the M and the N can be divisible by 64, a total frame number of both all left view color images of the $L_{org}$ and all right view color images of the $R_{org}$ is F, here, $F \geq 1$, $n_W$ is a integer and $$n_W \in \left[2, \frac{2 \times M \times N \times F}{64 \times 64}\right],$$

$w_{n_W} w_{n_W-1} \ldots w_i \ldots w_2 w_1$ respectively represent a value of a $(n_W)^{th}$ bit, a value of a $(n_W-1)^{th}$ bit, ..., a value of an $i^{th}$ bit, ..., a value of a second bit and a value of a first bit, each of the $w_{n_W} w_{n_W-1} \ldots w_i \ldots w_2 w_1$ is 0 or 1, $1 \leq i \leq n_W$;

(1B) obtaining a stereo saliency image of each left view color image of the $L_{org}$ through an existing stereo image saliency model, recording a stereo saliency image of a $j^{th}$ left view color image of the $L_{org}$ as $P_{org,j}^u$, calculating an otsu threshold of the stereo saliency image of each left view color image of the $L_{org}$ and recording the otsu threshold of the $L_{org,j}^u$ as $y_j^L$, wherein $1 \leq j \leq F$, also, obtaining a stereo saliency image of each right view color image of the $R_{org}$ through the existing stereo image saliency model, recording a stereo saliency image of a $j^{th}$ right view color image of the $R_{org}$ as $R_{org,j}^u$, calculating an otsu threshold of the stereo saliency image of each right view color image of the $R_{org}$, and recording the otsu threshold of the $R_{org,j}^u$ as $y_j^R$;

(1C) dividing the stereo saliency image of each left view color image of the $L_{org}$ into non-overlapped $$\left(\frac{M}{64} \times \frac{N}{64}\right)$$

image blocks each of which has a size of 64×64, recording a $k^{th}$ image block of the $L_{org,j}^u$ as $B_{org,j,k}^L$, calculating a mean value of pixel values of all pixels of each image block of the stereo saliency image of each left view color image of the $L_{org}$, recording the mean value of the pixel values of all the pixels of the $B_{org,j,k}^L$ as $q_{j,k}^L$, determining whether each image block of the stereo saliency image of each left view color image of the $L_{org}$ is a salient block or a non-salient block according to the mean value of the pixel values of all the pixels of each image block of the stereo saliency image of each left view color image of the $L_{org}$ and the otsu threshold of the stereo saliency image of each left view color image of the $L_{org}$, wherein: if the $q_{j,k}^L$ is larger than or equal to the $y_j^L$, the $B_{org,j,k}^L$ is determined to be the salient block, if the $q_{j,k}^L$ is smaller than the $y_j^L$, the $B_{org,j,k}^L$ is determined to be the non-salient block, here, $$1 \le k \le \frac{M}{64} \times \frac{N}{64},$$

also, dividing the stereo saliency image of each right view color image of the $R_{org}$ into non-overlapped $$\left(\frac{M}{64} \times \frac{N}{64}\right)$$

image blocks each of which has a size of 64×64, recording a $k^{th}$ image block of the $R_{org,j}^u$ as $B_{org,j,k}^R$, calculating a mean value of pixel values of all pixels of each image block of the stereo saliency image of each right view color image of the $R_{org}$, recording the mean value of the pixel values of all the pixels of the $B_{org,j,k}^R$ as $q_{j,k}^R$, determining whether each image block of the stereo saliency image of each right view color image of the $R_{org}$ is a salient block or a non-salient block according to the mean value of the pixel values of all the pixels of each image block of the stereo saliency image of each right view color image of the $R_{org}$ and the otsu threshold of the stereo saliency image of each right view color image of the $R_{org}$, wherein: if the $q_{j,k}^R$ is larger than or equal to the $y_j^R$, the $B_{org,j,k}^R$ is determined to be the salient block, if the $q_{j,k}^R$ is smaller than the $y_j^R$, the $B_{org,j,k}^R$ is determined to be the non-salient block;

(1D) generating a binary pseudorandom sequence which contains $n_W$ bits through logistics chaotic mapping, taking the binary pseudorandom sequence as a secret key and recording the secret key as E, here, $E = e_{n_W} e_{n_W-1} \ldots e_i \ldots e_2 e_1$, perform an XOR (exclusive OR) operation on a value of each bit of the W and a value of each corresponding bit of the E, obtaining an XOR result, taking the XOR result as encrypted information and recording the encrypted information as W', here, $W' = w'_{n_W} w'_{n_W-1} \ldots w'_i \ldots w'_2 w'_1$, wherein: the $e_{n_W} e_{n_W-1} \ldots e_i \ldots e_2 e_1$ respectively represent a value of the $(n_W)^{th}$ bit, a value of the $(n_W-1)^{th}$ bit, ..., a value of the $(i)^{th}$ bit, ... a value of the second bit and a value of the first bit of the E, each of the $e_{n_W} e_{n_W-1} \ldots e_i \ldots e_2 e_1$ is 0 or 1, $w'_{n_W} w'_{n_W-1} \ldots w'_2 w'_1$ respectively represent a value of the $(n_W)^{th}$ bit, a value of the $(n_W-1)^{th}$ bit, ..., a value of the $(i)^{th}$ bit, ... a value of the second bit and a value of the first bit of the W', each of the $w'_{n_W} w'_{n_W-1} \ldots w'_i \ldots w'_2 w'_1$ is 0 or 1, $w'_i$ is an XOR value of the $w_i$ and the $e_i$;

(1E) coding the $L_{org}$ and the $R_{org}$ in frame through a 3D-HEVC standard coding platform, defining a $j^{th}$ left view color image of the $L_{org}$ to be coded or a $j^{th}$ right view color image of the $R_{org}$ to be coded as a current frame and recording the current frame as $P_j$ wherein an initial value of the j is 1, while encoding the $L_{org}$ and the $B_{org}$, a $1^{st}$ left view color image of the $L_{org}$ and a $1^{st}$ right view color image of the $R_{org}$ are in turn, and so on, till a $F^{th}$ left view color image of the $L_{org}$ and a $F^{th}$ right view color image of the $R_{org}$ are encoded, and an entire encoding process is completed;

(1F) judging whether the $P_j$ is a P-frame or a B-frame, wherein if it is, step (1G) is executed, if it is not, step (1I) is executed;

(1G) coding the $P_j$ in coding-tree-unit (CTU), defining a $k^{th}$ coding-tree-unit to be coded of the $P_j$ as a current coding block and recording the current coding block as $B_{org,j,k}$, wherein $$1 \le k \le \frac{M}{64} \times \frac{N}{64},$$

here an initial value of the k is 1;

(1H-a) reading coding quantization parameter of the $B_{org,j,k}$ and recording the coding quantization parameter as $QP_{org,j,k}$, reading a value $w'_{i'}$ of a $i'^{th}$ bit of the W' and a value $w'_{i'+1}$ of a $(i'+1)^{th}$ bit of the W', transforming the $w'_{i'+1}$ and the $w'_{i'}$ into decimal value and recording the decimal values as $d_{i'}$, here, $$d_{i'} = \begin{cases} 0 & w'_{i'+1} w'_{i'} = 00 \\ 1 & w'_{i'+1} w'_{i'} = 01 \\ 2 & w'_{i'+1} w'_{i'} = 10 \\ 3 & w'_{i'+1} w'_{i'} = 11 \end{cases},$$

wherein an initial value of the i' is 1, $1 \le i' \le n_W - 1$, and each of $w'_{i'}$ and $w'_{i'+1}$ is 0 or 1;

(1H-b) when the $P_j$ is the $j^{th}$ left view color image of the $L_{org}$, judging whether a remainder result of the $QP_{org,j,k}$ to 4 is equal to the $d_{i'}$, wherein if the remainder result is not equal to the $d_{i'}$, when the $B_{org,j,k}^L$ is a salient block, the $QP_{org,j,k}$ is downwardly modulated by the $w'_{i'}$ and the $w'_{i'+1}$, so that coding quantization parameter embedded with secret information of the $B_{org,j,k}$ is obtained and recorded as $QP'_{org,j,k}$, and then step (1H-c) is executed; when the $B_{org,j,k}^L$ is a non-salient block, the $QP_{org,j,k}$ is upwardly modulated by the $w'_{i'}$ and the $w'_{i'+1}$, so that the coding quantization parameter embedded with secret information of the $B_{org,j,k}$ is obtained and recorded as the $QP'_{org,j,k}$, and then the step (1H-c) is executed; if the remainder result is equal to the $d_{i'}$, the $QP_{org,j,k}$ is directly recorded as the coding quantization parameter embedded with secret information of the $B_{org,j,k}$ which is denoted as the $QP'_{org,j,k}$, $QP'_{org,j,k} = QP_{org,j,k}$, and then the step (1H-c) is executed, here, "=" is an assignment symbol in the $QP'_{org,j,k} = QP_{org,j,k}$;

when the $P_j$ is the $j^{th}$ right view color image of the $R_{org}$, judging whether a remainder result of the $QP_{org,j,k}$ to 4 is equal to the $d_{i'}$, wherein if the remainder result is not equal to the $d_{i'}$, when the $B_{org,j,k}^R$ is a salient block, the $QP_{org,j,k}$ downwardly modulated by the $w'_{i'}$ and the $w'_{i'+1}$, so that coding quantization parameter embedded with secret information of the $B_{org,j,k}$ is obtained and recorded as $QP'_{org,j,k}$, and then the step (1H-c) is executed; when the $B_{org,j,k}^R$ is a non-salient block, the $QP_{org,j,k}$ upwardly modulated by the $w'_{i'}$ and the $w'_{i'+1}$, so that the coding quantization parameter embedded with secret information of the $B_{org,j,k}$ is obtained and recorded as the $QP'_{org,j,k}$, and then the step (1H-c) is executed; if the remainder result is equal to the $d_{i'}$, the $QP_{org,j,k}$ is directly recorded as the coding quantization parameter embedded with secret information of the $B_{org,j,k}$ which is denoted as the $QP'_{org,j,k}$, $QP'_{org,j,k}=QP_{org,j,k}$, and then the step (1H-c) is executed;

(1H-c) judging whether the $QP'_{org,j,k}$ is in a range of [0, 51], wherein if it is, step (1H-d) is executed; otherwise, when $QP'_{org,j,k}>51$, the $QP_{org,j,k}$ is downwardly modulated by the $w'_{i'}$ and the $w'_{i'+1}$ the coding quantization parameter embedded with secret information $QP'_{org,j,k}$ of the $B_{org,j,k}$ is obtained again, and then the step (1H-d) is executed; when $QP'_{org,j,k}<0$, the $QP_{org,j,k}$ is upwardly modulated by the $w'_{i'}$ and the $w'_{i'+1}$, the coding quantization parameter embedded with secret information $QP'_{org,j,k}$ of the $B_{org,j,k}$ is obtained again, and then the step (1H-d) is executed;

(1H-d) coding the $B_{org,j,k}$ with the $QP'_{org,j,k}$, completing a secret information embedded process of the $B_{org,j,k}$, after completing coding of the $B_{org,j,k}$, judging whether the $B_{org,j,k}$ is a skip block, wherein if it is, step (1H-e) is directly executed, otherwise, i'=i'+2 is set, the step (1H-e) is executed, here, "=" is an assignment symbol in the i'=i'+2;

(1H-e) setting k=k+1, regarding a next coding-tree-unit to be coded of the $P_j$ as a current coding block and recording the next coding-tree-unit to be coded as $B_{org,j,k}$, returning to the step (1H-a) to continue till all coding-tree-units of the $P_j$ are completely coded, executing step (1I), wherein "=" is an assignment symbol in the k=k+1;

(1I) setting j=j+1, regarding a next left view color image to be coded of the $L_{org}$ or a next right view color image to be coded of the $R_{org}$ as a current frame and recording the current frame as $P_j$, returning to the step (1F) and continuing till all left view color images in the $L_{org}$ and all right view color images in the $R_{org}$ are completely coded, and obtaining video stream embedded with secret information, wherein "=" is an assignment symbol in the j=j+1; and (1J) sending initial value information which generates the secret key E to an information extraction terminal.

FIG. 1b shows a general block diagram of the step of information extraction, which is specifically embodied as:

(2A) defining the video stream embedded with secret information received at an information extraction terminal (for example, a decoder of stereo video signal) as a target video stream and recording the target video stream as $str.bin_{dec}$;

(2B) according to the initial value information which generates the secret key E sent from an information embedding terminal, through the logistics chaotic mapping, generating a secret key E which is same as that of the information embedding terminal, wherein if the secret key E is directly transmitted to the information extraction terminal, then side information is too big, due to the process of generating the secret key is relatively simple, the secret key can be reproduced only by giving an initial value, and therefore, based on the initial value information which generates the secret key E sent from the information embedding terminal, it is only necessary to re-generate for obtaining the secret key at the information extraction terminal as same as the secret key at the information embedding terminal;

(2C) parsing the $str.bin_{dec}$ frame by frame, and defining a frame to be parsed in the $str.bin_{dec}$ as a current frame;

(2D) judging the current frame is a P-frame or B-frame, wherein if it is, step (2E) is executed, otherwise, step (2H) is executed;

(2E) parsing the current frame coding-tree-unit (CTU) by coding-tree-unit, and defining a coding-tree-unit to be parsed in the current frame as a current parsing block;

(2F) judging whether the current parsing block is a skip block, wherein if it is, step (2G) is executed, otherwise, coding quantization parameter embedded with secret information of the current parsing block are parsed and recorded as $QP'_{dec}$, and then a remainder result of $QP'_{dec}$ to 4 is calculated and recorded as $d'_{dec}$, wherein the $d'_{dec}$ is 0, 1, 2 or 3, and then the decimal $d'_{dec}$ is transformed to binary number, values of two bits extracted from the current parsing block are obtained, such that a secret information extraction process of the current parsing block is completed, and then the step (2G) is executed;

(2G) regarding a next coding-tree-unit to be parsed of the current frame as a current parsing block, and then returning to the step (2F) till all coding-tree-units of the current frame are completely processed, and then step (2H) is executed;

(2H) regarding a next frame to be parsed of the $str.bin_{dec}$ as a current frame, and then returning to the step (2D) till all frames of the $str.bin_{dec}$ are completely processed, such that secret information extraction is completed; and (2I) defining extracted values of $n_W$ bits as encrypted information and recording the encrypted information as $W'_{dec}$, here, $W'_{dec}=w'_{dec,n_W} w'_{dec,n_W-1} \ldots w'_{dec,i} \ldots w'_{dec,2} w'_{dec,1}$, and then perform an XOR (exclusive OR) operation on a value of each bit of the $W'_{dec}$ and a value of each corresponding bit of the E, obtaining an XOR result, taking the XOR result as decrypt secret information and recording the decrypt secret information as $W_{dec}$, here, $W_{dec}=w_{dec,n_W} w_{dec,n_W-1} \ldots w_{dec,i} \ldots w_{dec,2} w_{dec,1}$, wherein: the $w'_{dec,n_W} w'_{dec,n_W-1} \ldots w'_{dec,i} \ldots w'_{dec,2} w'_{dec,1}$, respectively represent a value of the $(n_W)^{th}$ bit, a value of the $(n_W-1)^{th}$ bit, ..., a value of the $(i)^{th}$ bit, ... a value of the second bit and a value of the first bit of the $W'_{dec}$, each of the $w'_{dec,n_W} w'_{dec,n_W-1} \ldots w'_{dec,i} \ldots w'_{dec,2} w'_{dec,1}$ is 0 or 1, $w_{dec,n_W} w_{dec,n_W-1} \ldots w_{dec,i} \ldots w_{dec,2} w_{dec,1}$ respectively represent a value of the $(n_W)^{th}$ bit, a value of the $(n_W-1)^{th}$ bit, ..., a value of the $(i)^{th}$ bit, ... a value of the second bit and a value of the first bit of the $W_{dec}$, each of the $w_{dec,n_W} w_{dec,n_W-1} \ldots w_{dec,i} \ldots w_{dec,2} w_{dec,1}$ is 0 or 1.

In the step (1H-b) of the method according to this specific embodiment, through the $w'_{i'}$ and the $w'_{i'+1}$, the $QP_{org,j,k}$ is downwardly modulated to obtain the $QP'_{org,j,k}$, which is specifically embodied as: (b1) finding out all values in an interval of $[-3,QP_{org,j,k}]$ which meet a condition that a remainder result of an absolute value of each of all the values to 4 is equal to $d_{i'}$; (b2) calculating an absolute value of a difference value of each of all the values found out in the step (b1) and the $QP_{org,j,k}$; and (b3) finding out a minimum absolute value of all absolute values calculated in the step (b2), and assigning a value found out in the step (b1), which is corresponding to the minimum absolute value, to the $QP'_{org,j,k}$, that is, $QP_{org,j,k}$ meets a condition of $$\begin{cases} QP'_{org,j,k} \in [-3, QP_{org,j,k}] \\ |QP'_{org,j,k}| \bmod 4 = d_{i'} \\ \min(|QP'_{org,j,k} - QP_{org,j,k}|) \end{cases},$$

wherein mod is a mathematical symbol for taking a remainder, and min( ) is a function for taking a minimum.

In the step (1H-b) of the method according to this specific embodiment, through the w'$_{i'}$ and the w'$_{i'+1}$, the QP$_{org,j,k}$ is upwardly modulated to obtain the QP'$_{org,j,k}$, which is specifically embodied as: (b1') finding out all values in an interval of [QP$_{org,j,k}$,54] which meet a condition that a remainder result of an absolute value of each of all the values to 4 is equal to d$_{i'}$; (b2') calculating an absolute value of a difference value of each of all the values found out in the step (b1') and the QP$_{org,j,k}$; and (b3') finding out a minimum absolute value of all absolute values calculated in the step (b2'), and assigning a value found out in the step (b1'), which is corresponding to the minimum absolute value, to the QP'$_{org,j,k}$, that is, QP'$_{org,j,k}$ meets a condition of $$\begin{cases} QP'_{org,j,k} \in [QP_{org,j,k}, 54] \\ QP'_{org,j,k} \bmod 4 = d_{i'} \\ \min(|QP'_{org,j,k} - QP_{org,j,k}|) \end{cases}.$$

In the step (1H-c) of the method according to this specific embodiment, through the w'$_{i'}$ and the w'$_{i'+1}$, the QP$_{org,j,k}$ is downwardly modulated to regain the QP'$_{org,j,k}$, which is specifically embodied as: (c1) finding out all values in an interval of [0,QP$_{org,j,k}$] which meet a condition that a remainder result of an absolute value of each of all the values to 4 is equal to d$_{i'}$; (c2) calculating an absolute value of a difference value of each of all the values found out in the step (c1) and the QP$_{org,j,k}$; and (c3) finding out a minimum absolute value of all absolute values calculated in the step (c2), and assigning a value found out in the step (c1), which is corresponding to the minimum absolute value, to the QP'$_{org,j,k}$, that is, QP'$_{org,j,k}$ meets a condition of $$\begin{cases} QP'_{org,j,k} \in [0, QP_{org,j,k}] \\ QP'_{org,j,k} \bmod 4 = d_{i'} \\ \min(|QP'_{org,j,k} - QP_{org,j,k}|) \end{cases}.$$

In the step (1H-c) of the method according to this specific embodiment, through the w'$_{i'}$ and the w'$_{i'+1}$, the QP$_{org,j,k}$ is upwardly modulated to regain the QP'$_{org,j,k}$, which is specifically embodied as: (c1') finding out all values in an interval of [QP$_{org,j,k}$,51] which meet a condition that a remainder result of an absolute value of each of all the values to 4 is equal to d$_{i'}$; (c2') calculating an absolute value of a difference value of each of all the values found out in the step (c1') and the QP$_{org,j,k}$; and (c3') finding out a minimum absolute value of all absolute values calculated in the step (c2'), and assigning a value found out in the step (c1'), which is corresponding to the minimum absolute value, to the QP'$_{org,j,k}$ that is, QP'$_{org,j,k}$ meets a condition of $$\begin{cases} QP'_{org,j,k} \in [QP_{org,j,k}, 51] \\ QP'_{org,j,k} \bmod 4 = d_{i'} \\ \min(|QP'_{org,j,k} - QP_{org,j,k}|) \end{cases}.$$

In order to verify the effectiveness and the feasibility of the method provided by the present invention, the method provided by the present invention is tested.

Adopted test sequences are as follows: a $3^{rd}$ and $5^{th}$ viewpoint of a Balloons stereo video sequence, a $2^{nd}$ and $4^{th}$ viewpoint of a Newspaper stereo video sequence, a $1^{st}$ and $9^{th}$ viewpoint of a Shark stereo video sequence and a $1^{st}$ and $9^{th}$ viewpoint of a UndoDancer stereo video sequence. A resolution of the former two stereo video sequences is 1024×768, and a resolution of the latter two stereo video sequences is 1920×1088. Test software is a coding platform HTM13.0 based on 3D-HEVC standard which codes 100 frames under random access, given target bit rates are respectively 2000, 4000, 5000 and 6000 kbps, and other configuration parameters are platform defaults. The performance of the method provided by the present invention will be respectively evaluated from the imperceptibility, the embedding capacity and the bit rate change of the stereo video sequence.

1) The Imperceptibility of the Stereo Video Sequence

Figure 2A:
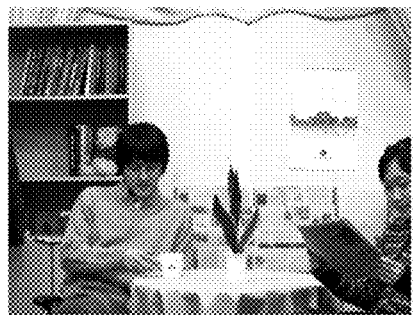
FIG. 2a is a second frame of a second viewpoint of a stereo video sequence reconstructed from an encoded Newspaper stereo video stream without using a method provided by the present invention.
Figure 2B:
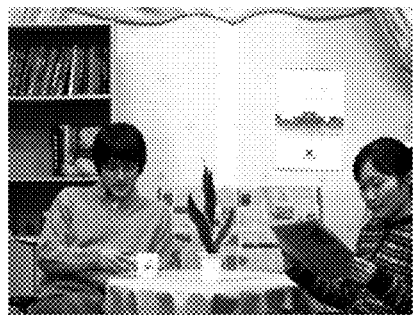
FIG. 2b is a second frame of a fourth viewpoint of a stereo video sequence reconstructed from an encoded Newspaper stereo video stream without using a method provided by the present invention.
Figure 2C:
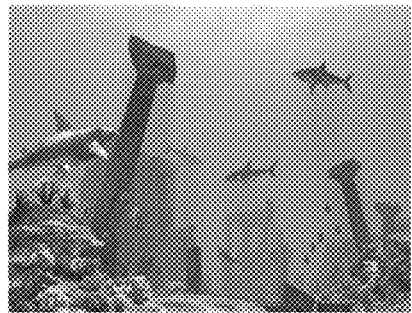
FIG. 2c is a second frame of a first viewpoint of a stereo video sequence reconstructed from an encoded Shark stereo video stream without using a method provided by the present invention.
Figure 2D:
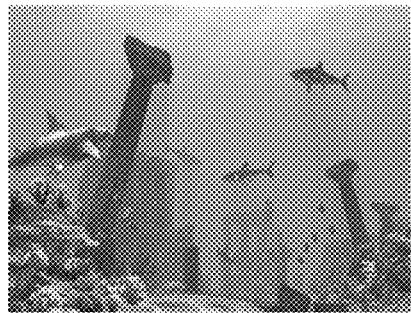
FIG. 2d is a second frame of a ninth viewpoint of a stereo video sequence reconstructed from an encoded Shark stereo video stream without using a method provided by the present invention.
Figure 2E:
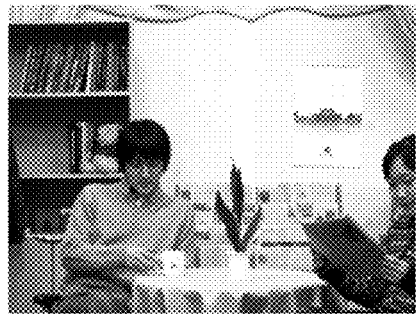
FIG. 2e is a second frame of a second viewpoint of a stereo video sequence reconstructed from a Newspaper stereo video stream encoded through a method provided by the present invention.
Figure 2F:
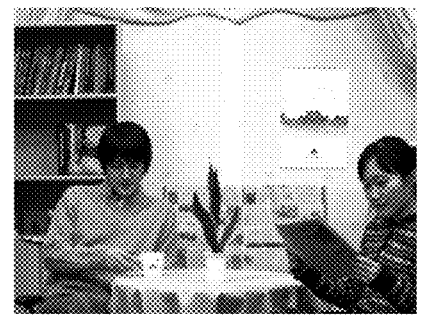
FIG. 2f is a second frame of a fourth viewpoint of a stereo video sequence reconstructed from a Newspaper stereo video stream encoded through a method provided by the present invention.
Figure 2G:
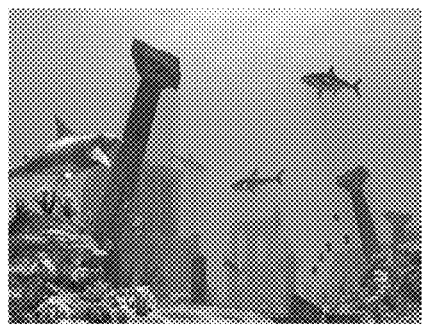
FIG. 2g is a second frame of a first viewpoint of a stereo video sequence reconstructed from a Shark stereo video stream encoded through a method provided by the present invention.
Figure 2H:
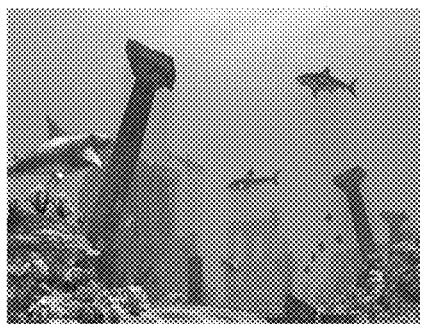
FIG. 2h is a second frame of a ninth viewpoint of a stereo video sequence reconstructed from a Shark stereo video stream encoded through a method provided by the present invention.

To verify the effect of the method provided by the present invention on the subjective quality of the stereo video sequence, here, the Newspaper stereo video sequence and the Shark stereo video sequence are selected to explain. FIG. 2a is a second frame of a second viewpoint of a stereo video sequence reconstructed from an encoded Newspaper stereo video stream without using the method provided by the present invention. FIG. 2b is a second frame of a fourth viewpoint of a stereo video sequence reconstruceted from an encoded Newspaper stereo video stream without using the method provided by the present invention. FIG. 2c is a second frame of a first viewpoint of a stereo video sequence reconstruceted from an encoded Shark stereo video stream without using the method provided by the present invention. FIG. 2d is a second frame of a ninth viewpoint of a stereo video sequence reconstruceted from an encoded Shark stereo video stream without using the method provided by the present invention. In other words, the frames in FIG. 2a, FIG. 2b, FIG. 2c and FIG. 2d are normally encoded through the coding platform HTM13.0 based on 3D-HEVC standard, therefore, these frames do not contain any secret information. By contrast, FIG. 2e is a second frame of a second viewpoint of a stereo video sequence reconstructed from a Newspaper stereo video stream encoded through a method provided by the present invention. FIG. 2f is a second frame of a fourth viewpoint of a stereo video sequence reconstructed from a Newspaper stereo video stream encoded through a method provided by the present invention. FIG. 2g is a second frame of a first viewpoint of a stereo video sequence reconstructed from a Shark stereo video stream encoded through a method provided by the present invention. FIG. 2h is a second frame of a ninth viewpoint of a stereo video sequence reconstructed from a Shark stereo video stream encoded through a method provided by the present invention. That is to say, the frames in FIG. 2e, FIG. 2f, FIG. 2g and FIG. 2h have been embedded in secret information. Compared FIG. 2a with FIG. 2e, FIG. 2b with FIG. 2f, FIG. 2c with FIG. 2g, and FIG. 2d with FIG. 2h, it can be seen that after secret information is embedded, the quality of the viewpoint of the stereo video sequence is not obviously distorted, which shows that the method provided by the present invention has a better stereo video imperceptibility.

To further evaluate the quality of the stereo video sequence, a representative index such as PSNR (peak signal-to-noise ratio) is introduced into the experiment to explain. Table 1 shows the quality of the stereo video sequences which are respectively obtained by performing normal encoding on an original Balloons stereo video sequence, an original Newspaper stereo video sequence, an original Shark stereo video sequence and an original UndoDancer stereo video sequence, and then decoding the encoded video stream, and also shows the quality of the stereo video sequences which are respectively obtained by performing encoding on an original Balloons stereo video sequence, an original Newspaper stereo video sequence, an original Shark stereo video sequence and an original UndoDancer stereo video sequence through the method provided by the present invention, and then decoding the encoded video stream. A computational formula of a variation ΔPSNR of the PSNR before and after inserting the secret information is ΔPSNR=$PSNR_{pro}$−$PSNR_{org}$, wherein the $PSNR_{pro}$ represent a mean PSNR of two viewpoints of the stereo video sequence obtained by performing encoding on an original stereo video sequence through the method provided by the present invention, and then decoding the encoded video stream, and $PSNR_{org}$ represents a mean PSNR of two viewpoints of the stereo video sequence obtained by performing normal encoding on an original stereo video sequence, and then decoding the encoded video stream. In this experiment, the imperceptibility of the stereo video sequence is explained through the ΔPSNR.

It can be seen from Table 1 that after being performed the encoding at different target bit rates, the stereo video sequence has different qualities. The reason is that the smaller the given target bit rate, the less the bits allocated to the viewpoint, the poor the quality of the reconstructed stereo video sequence. Simultaneously, in Table 1, the absolute value of ΔPSNR is in a range of 0.0014-0.0524 dB, and the average of ΔPSNR is −0.03139 dB, which shows that the method provided by the present invention has a slight impact on the quality of the encoded stereo video sequence. The method provided by the present invention combines with the stereo image salient model to guide the embedding of the secret information, and only finely tunes the coding quantization parameters, so that the method provided by the present invention has a smaller impact on the quality of the stereo video sequence.

TABLE 1

The impact of the method provided by the present invention on the quality of encoded stereo video sequences

| Stereo video sequence | Resolution | Target bit rate | PSNR (dB) | | |
|---|---|---|---|---|---|
| | | | $PSNR_{org}$ | $PSNR_{pro}$ | ΔPSNR |
| Balloons | 1024 × 768 | 2000 | 43.3970 | 43.3490 | −0.0480 |
| | | 4000 | 44.5928 | 44.5620 | −0.0308 |
| | | 5000 | 44.9503 | 44.9126 | −0.0377 |
| | | 6000 | 45.2222 | 45.1847 | −0.0375 |
| Newspaper | 1024 × 768 | 2000 | 41.8957 | 41.8433 | −0.0524 |
| | | 4000 | 43.7668 | 43.7223 | −0.0445 |
| | | 5000 | 44.2632 | 44.2175 | −0.0457 |
| | | 6000 | 44.7029 | 44.6653 | −0.0376 |

TABLE 1-continued

The impact of the method provided by the present invention on the quality of encoded stereo video sequences

| Stereo video sequence | Resolution | Target bit rate | PSNR (dB) | | |
|---|---|---|---|---|---|
| | | | $PSNR_{org}$ | $PSNR_{pro}$ | ΔPSNR |
| Shark | 1920 × 1088 | 2000 | 35.2779 | 35.2452 | −0.0327 |
| | | 4000 | 38.3170 | 38.3011 | −0.0159 |
| | | 5000 | 39.3162 | 39.2982 | −0.0180 |
| | | 6000 | 40.1200 | 40.0972 | −0.0228 |
| UndoDancer | 1920 × 1088 | 2000 | 34.2069 | 34.1915 | −0.0154 |
| | | 4000 | 36.4754 | 36.4579 | −0.0175 |
| | | 5000 | 37.1667 | 37.1681 | 0.0014 |
| | | 6000 | 37.7911 | 37.7440 | −0.0471 |

2) Embedded Capacity and Bit Rate Change of the Stereo Video Sequence

Generally speaking, in the encoding process of the stereo video sequence, embedding the secret information through the coding quantization parameters causes a change in the coding bit rate. Table 2 shows test results of the embedded capacity and the bit rate change of the Balloons stereo video sequence, the Newspaper stereo video sequence, the Shark stereo video sequence and the UndoDancer stereo video sequence through the method provided by the present invention. In Table 2, the embedded capacity is a total sum of the embedded capacities of the stereo video sequences, and the bit rate change is defined as $$BRI = \frac{R_{pro} - R_{org}}{R_{org}} \times 100\%,$$

here, the $R_{pro}$ represents a bit rate of an original stereo video sequence after being processed through the method provided by the present invention and then performed the compression coding, and the $R_{org}$ represents a bit rate of an original stereo video sequence after being performed the compression coding.

It can be seen from Table 2 that with the increase of the resolution of the stereo video sequence, the embedded capacity is increased, the reason is that the greater the resolution, the more the allocated coding-tree-units, the more the embedded vectors. An average embedded capacity of the stereo video sequence at different target bit rates is 47236 bits, and the bit rate is average increased by 0.0741%, which shows that the method provided by the present invention can provide high embedded capacity and has less effect on the bit rate of the coding, due to the method provided by the present invention finely tunes the coding quantization parameters, simultaneously starts the bit rate control module to effectively restrain the change of the bit rate.

TABLE 2

Test results of the embedded capacity and the bit rate change of the method provided by the present invention

| Stereo video sequence | Resolution | Target bit rate | Embedded capacity (bit) | Bit rate (kbps) Original coding | Bit rate (kbps) Present invention | Change rate |
|---|---|---|---|---|---|---|
| Balloons | 1024 × 768 | 2000 | 33760 | 2036.950 | 2036.928 | −0.0011% |
|  |  | 4000 | 46058 | 4013.657 | 4013.998 | 0.0085% |
|  |  | 5000 | 52696 | 5004.686 | 5005.380 | 0.0139% |
|  |  | 6000 | 56538 | 6004.975 | 6005.556 | 0.0097% |
| Newspaper | 1024 × 768 | 2000 | 26772 | 2048.866 | 2049.118 | 0.0123% |
|  |  | 4000 | 38038 | 4056.552 | 4057.445 | 0.0220% |
|  |  | 5000 | 44332 | 5048.395 | 5048.206 | −0.0037% |
|  |  | 6000 | 49170 | 6027.574 | 6027.962 | 0.0064% |
| Shark | 1920 × 1088 | 2000 | 40864 | 2002.462 | 2002.202 | −0.0130% |
|  |  | 4000 | 56782 | 4010.378 | 4012.063 | 0.0420% |
|  |  | 5000 | 63356 | 5008.946 | 5012.633 | 0.0736% |
|  |  | 6000 | 69100 | 6007.138 | 6006.845 | −0.0049% |
| UndoDancer | 1920 × 1088 | 2000 | 29438 | 2016.056 | 2014.082 | −0.0979% |
|  |  | 4000 | 43588 | 4074.594 | 4104.764 | 0.7404% |
|  |  | 5000 | 49358 | 5063.886 | 5098.290 | 0.6794% |
|  |  | 6000 | 55924 | 6120.974 | 6102.510 | −0.3017% |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A 3D-HEVC (Three Dimensional High Efficiency Video Coding) inter-frame information hiding method based on visual perception comprising steps of information embedding and information extraction, wherein:

the step of information embedding comprises:

(1A) at an information embedding terminal, taking $S_{org}$ as an original stereo video, recording a left view color video of the $S_{org}$ as $L_{org}$, recording a right view color video of the $S_{org}$ as $R_{org}$, and taking W as secret information to be embedded, wherein: W is a binary number which contains $n_W$ bits, $W = w_{n_W} w_{n_W-1} L\ w_i L\ w_2 w_1$, a width of both a left view color image of the $L_{org}$ and a right view color image of the $R_{org}$ is M, a height thereof is N, both the M and the N can be divisible by 64, a total frame number of both all left view color images of the $L_{org}$ and all right view color images of the $R_{org}$ is F, here, F≥1, $n_W$ is a integer and $$n_W \in \left[2, \frac{2 \times M \times N \times F}{64 \times 64}\right],$$

$w_{n_W} w_{n_W-1} L\ w_i L\ w_2 w_1$ respectively represent a value of a $(n_W)^{th}$ bit, a value of a $(n_W-1)^{th}$ bit, . . . , a value of an $i^{th}$ bit, . . . , a value of a second bit and a value of a first bit, each of the $w_{n_W} w_{n_W-1} L\ w_i L\ w_2 w_1$ is 0 or 1, 1≤i≤$n_W$;

(1B) obtaining a stereo saliency image of each left view color image of the $L_{org}$ through a stereo image saliency model, recording a stereo saliency image of a $j^{th}$ left view color image of the $L_{org}$ as $L_{org,j}^u$, calculating an otsu threshold of the stereo saliency image of each left view color image of the $L_{org}$, and recording the otsu threshold of the $L_{org,j}^u$ as $y_j^L$, wherein 1≤j≤F, also, obtaining a stereo saliency image of each tight view color image of the $R_{org}$ through the stereo image saliency model, recording a stereo saliency image of a $j^{th}$ right view color image of the $R_{org}$ as $R_{org,j}^u$, calculating an otsu threshold of the stereo saliency image of each right view color image of the $R_{org}$, and recording the otsu threshold of the $R_{org,j}^u$ as $y_j^R$;

(1C) dividing the stereo saliency image of each left view color image of the $L_{org}$ into non-overlapped $$\left(\frac{M}{64} \times \frac{N}{64}\right)$$

image blocks each of which has a size of 64×64 recording a $k^{th}$ image block of the $L_{org,j}^u$ as $B_{org,j,k}^L$, calculating a mean value of pixel values of all pixels of each image block of the stereo saliency image of each left view color image of the $L_{org}$, recording the mean value of the pixel values of all the pixels of the $B_{org,j,k}^L$ as $q_{j,k}^L$, determining whether each image block of the stereo saliency image of each left view color image of the $L_{org}$ is a salient block or a non-salient block according to the mean value of the pixel values of all the pixels of each image block of the stereo saliency image of each left view color image of the $L_{org}$ and the otsu threshold of the stereo saliency image of each left view color image of the $L_{org}$, wherein: if the $q_{j,k}^L$ is larger than or equal to the $y_j^L$, the $B_{org,j,k}^L$ is determined to be the salient block, if the $q_{j,k}^L$ is smaller than the $y_j^L$, the $B_{org,j,k}^L$ is determined to be the non-salient block, here, $$1 \leq k \leq \frac{M}{64} \times \frac{N}{64},$$

also, dividing the stereo saliency image of each right view color image of the $R_{org}$ into non-overlapped $$\left(\frac{M}{64} \times \frac{N}{64}\right)$$

image blocks each of which has a size of 64×64, recording a $k^{th}$ image block of the $R_{org,j}^{u}$ as $B_{org,j,k}^{R}$, calculating a mean of pixel values of all pixels of each image block of the stereo saliency image of each right view color image of the $R_{org}$, recording the mean value of the pixel values of all the pixels of the $B_{org,j,k}^{R}$ as $q_{j,k}^{R}$, determining whether each image block of the stereo saliency image of each right view color image of the $R_{org}$ is a salient block or a non-salient block according to the mean value of the pixel values of all the pixels of each image block of the stereo saliency image of each right view color image of the $R_{org}$ and the otsu threshold of the stereo saliency image of each right view color image of the $R_{org}$, wherein: if the $q_{j,k}^{R}$ is larger than or equal to the $y_j^R$, the $B_{org,j,k}^{R}$ is determined to be the salient block, if the $q_{j,k}^{R}$ is smaller than the $y_j^R$, the $B_{org,j,k}^{R}$ is determined to be the non-salient block;

(1D) generating a binary pseudorandom sequence which contains $n_W$ bits through logistics chaotic mapping, taking the binary pseudorandom sequence as a secret key and recording the secret key as E, here, $E=e_{n_W} e_{n_W-1} L\ e_i L\ e_2 e_1$, perform an XOR (exclusive OR) operation on a value of each bit of the W and a value of each corresponding bit of the E, obtaining an XOR result, taking the XOR result as encrypted information and recording the encrypted information as W', here, $W'=w'_{n_W} w'_{n_W-1} L\ w'_i L\ w'_2 w'_1$, wherein: the $e_{n_W} e_{n_W-1} L\ e_i L\ e_2 e_1$ respectively represent a value of the $(n_W)^{th}$ bit, a value of the $(n_W-1)^{th}$ bit, ..., a value of the $(i)^{th}$ bit, ... a value of the second bit and a value of the first bit of the E each of the $e_{n_W} e\ e_{n_W-1} L\ e_i L\ e_2 e_1$ is 0 or 1, $w'_{n_W} w'_{n_W-1} L\ w'_i L\ w'_2 w'_1$ respectively represent a value of the $(n_W)^{th}$ bit, a value of the $(n_W-1)^{th}$ bit, ..., a value of the $(i)^{th}$ bit, ... a value of the second bit and a value of the first bit of the W', each of the $w'_{n_W} w'_{n_W-1} L\ w'_i L\ w'_2 w'_1$ is 0 or 1, w'$_i$ is an XOR value of the $w_i$ and the $e_i$;

(1E) coding the $L_{org}$ and the $R_{org}$ in frame through a 3D-HEVC standard coding platform, defining a $j^{th}$ left view color image of the $L_{org}$ to be coded or a $j^{th}$ tight view color image of the $R_{org}$ to be coded as a current frame and recording the current frame as $P_j$, wherein an initial value of the j is 1;

(1F) judging whether the $P_j$ is a P-frame or a B-frame, wherein if it is, step (1G) is executed, if it is not, step (1I) is executed;

(1G) coding the $P_j$ in coding-tree-unit, defining a $k^{th}$ coding-tree-unit to be coded of the $P_j$ as a current coding block and recording the current coding block as $B_{org,j,k}$, wherein $$1 \le k \le \frac{M}{64} \times \frac{N}{64},$$

here an initial value of the k is 1;

(1H-a) reading coding quantization parameter of the $B_{org,j,k}$ and recording the coding quantization parameter as $QP_{org,j,k}$, reading a value $w'_{i'}$ of a $i'^{th}$ bit of the W' and a value $w'_{i'+1}$ of a $(i'+1)^{th}$ bit of the W', transforming the $w'_{i'+1}$ and the $w'_{i'}$ into decimal values and recording the decimal value as $d_{i'}$, here, $$d_{i'} = \begin{cases} 0 & w'_{i'+1} w'_{i'} = 00 \\ 1 & w'_{i'+1} w'_{i'} = 01 \\ 2 & w'_{i'+1} w'_{i'} = 10 \\ 3 & w'_{i'+1} w'_{i'} = 11 \end{cases},$$

wherein an initial value of the i' is 1, $1 \le i' \le n_W-1$, and each of $w'_{i'+1}$ and is 0 or 1;

(1H-b) when the $P_j$ is the $j^{th}$ left view color image of the $L_{org}$, judging whether a remainder result of the $QP_{org,j,k}$ to 4 is equal to the $d_{i'}$, wherein if the remainder result is not equal to the $d_{i'}$, when the $B_{org,j,k}^{L}$ is a salient block, the $QP_{org,j,k}$ is downwardly modulated by the $w'_{i'}$ and the $w'_{i'+1}$, so that coding quantization parameter embedded with secret information of the $B_{org,j,k}$ is obtained and recorded as $QP'_{org,j,k}$, and then step (1H-c) is executed; when the $B_{org,j,k}^{L}$ is a non-salient block, the $QP_{org,j,k}$ is upwardly modulated by the $w'_{i'}$ and the $w'_{i'+1}$, so that the coding quantization parameter embedded with secret information of the $B_{org,j,k}$ is obtained and recorded as the $QP'_{org,j,k}$ and then the step (1H-c) is executed; if the remainder result is equal to the $d_{i'}$, the $QP_{org,j,k}$ is directly recorded as the coding quantization parameter embedded with secret information of the $B_{org,j,k}$ which is denoted as the $QP'_{org,j,k}$, $QP'_{org,j,k}=QP_{org,j,k}$, and then the step (1H-c) is executed, here, "=" is an assignment symbol in the $QP'_{org,j,k}=QP_{org,j,k}$;

when the $P_j$ is the $j^{th}$ right view color image of the $R_{org}$, judging whether a remainder result of the $QP_{org,j,k}$ to 4 is equal to $d_{i'}$, the wherein if the remainder result is not equal to the $d_{i'}$, when the $B_{org,j,k}^{R}$ is a salient block, the $QP_{org,j,k}$ is downwardly modulated by the $w'_{i'}$ and the $w'_{i'+1}$ so that coding quantization parameter embedded with secret information of the $B_{org,j,k}$ is obtained and recorded as $QP'_{org,j,k}$, and then the step (1H-c) is executed; when the $B_{org,j,k}^{R}$ is a non-salient block, the $QP_{org,j,k}$ is upwardly modulated by the $w'_{i'}$ and the $w'_{i'+1}$, so that the coding quantization parameter embedded with secret information of the $B_{org,j,k}$ is obtained and recorded as the $QP'_{org,j,k}$ and then the step (1H-c) is executed; if the remainder result is equal to the $d_{i'}$, the $QP_{org,j,k}$ is directly recorded as the coding quantization parameter embedded with secret information of the $B_{org,j,k}$ which is denoted as the $QP'_{org,j,k}$, $QP'_{org,j,k}=QP_{org,j,k}$ and then the step (1H-c) is executed;

(1H-c) judging whether the $QP'_{org,j,k}$ is in a range of [0, 51], wherein if it is, step (1H-d) is executed; otherwise, when $QP'_{org,j,k}>51$, the $QP_{org,j,k}$ is downwardly modulated by the $w'_{i'}$ and the $w'_{i'+1}$, the coding quantization parameter embedded with secret information $QP'_{org,j,k}$ of the $B_{org,j,k}$ is obtained again, and then the step (1H-d) is executed; when $QP'_{org,j,k}<0$, the $QP_{org,j,k}$ is upwardly modulated by the $w'_{i'}$ and the $w'_{i'+1}$, the coding quantization parameter embedded with secret information $QP'_{org,j,k}$ of the $B_{org,j,k}$ is obtained again, and then the step (1H-d) is executed;

(1H-d) coding the $B_{org,j,k}$ with the $QP'_{org,j,k}$, completing a secret information embedded process of the $B_{org,j,k}$, after completing coding of the $B_{org,j,k}$, judging whether the $B_{org,j,k}$ is a skip block, wherein if it is, step (1H-e) is directly executed, otherwise, i'=i'+2 is set, the step (1H-e) is executed, here, "=" is an assignment symbol in the i'=i'+2;

(1H-e) setting k=k+1 regarding a next coding-tree-unit to be coded of the $P_j$ as a current coding block and recording the next coding-tree-unit to be coded as $B_{org,j,k}$, returning to the step (1H-a) to continue till all coding-tree-units of the $P_j$ are completely coded, executing step (1I), wherein "=" is an assignment symbol in the k=k+1;

(1I) setting j=j+1, regarding a next left view color image to be coded of the $L_{org}$ or a next right view color image to be coded of the $R_{org}$ as a current frame and recording the current frame as $P_j$, returning to the step (1F) and continuing till all left view color images in the $L_{org}$ and all right view color images in the $R_{org}$ are completely coded, and obtaining video stream embedded with secret information, wherein "=" is an assignment symbol in the j=j+1; and (1J) an information embedding terminal sending initial value information which generates the secret key E to an information extraction terminal;

the step of information extraction comprises:

(2A) defining the video stream embedded with secret information received at an information extraction terminal as a target video stream and recording the target video stream as $str.bin_{dec}$;

(2B) according to the initial value information sent from the information embedding terminal in step (1J), through the logistics chaotic mapping, the information extraction terminal generating another secret key E which is as same as the secret key E of the information embedding terminal;

(2C) parsing the $str.bin_{dec}$ frame by frame, and defining a frame to be parsed in the $str.bin_{dec}$ as a current frame;

(2D) judging the current frame is a P-frame or B-frame, wherein if it is, step (2E) is executed, otherwise, step (2H) is executed;

(2E) parsing the current frame coding-tree-unit by coding-tree-unit, and defining a coding-tree-unit to be parsed in the current frame as a current parsing block;

(2F) judging whether the current parsing block is a skip block, wherein if it is, step (2G) is executed, otherwise, coding quantization parameter embedded with secret information of the current parsing block are parsed and recorded as $OP'_{dec}$, and then a remainder result $QP'_{dec}$ of to 4 is calculated and recorded as $d'_{dec}$, wherein the $d'_{dec}$ is 0, 1, 2 or 3, and then the decimal $d'_{dec}$ is transformed to binary number, values of two bits extracted from the current parsing block are obtained, such that a secret information extraction process of the current parsing block is completed, and then the step (2G) is executed;

(2G) regarding a next coding-tree-unit to be parsed of the current frame as a current parsing block, and then returning to the step (2F) till all coding-tree-units of the current frame are completely processed, and then step (2H) is executed;

(2H) regarding a next frame to be parsed of the $str.bin_{dec}$ as a current frame, and then returning to the step (2D) till all frames of the $str.bin_{dec}$ are completely processed, such that secret information extraction is completed; and (2I) defining extracted values of $n_W$ bits as encrypted information and recording the encrypted information as $W'_{dec}$, here, $W'_{dec}=w'_{dec,n_W}w'_{dec,n_W-1}L\ w'_{dec,i}L\ w'_{dec,2}w'_{dec,1}$, and then perform an XOR (exclusive OR) operation on a value of each bit of the $W'_{dec}$ and a value of each corresponding bit of the E, obtaining an XOR result, taking the XOR result as decrypt secret information and recording the decrypt secret information as $W'_{dec}$, here, $W'_{dec}=w'_{dec,n_W}w'_{dec,n_W-1}L\ w'_{dec,i}L\ w'_{dec,2}w'_{dec,1}$, wherein: the $w'_{dec,n_W}w'_{dec,n_W-1}L\ w'_{dec,i}L\ w'_{dec,2}w'_{dec,1}$ respectively represent a value of the $(n_W)^{th}$ bit, a value of the $(n_W-1)^{th}$ bit, . . . , a value of the $(i)^{th}$ bit, . . . a value of the second bit and a value of the first bit of the $W'_{dec}$, each of the $w'_{dec,n_W}w'_{dec,n_W-1}L\ w'_{dec,i}L\ w'_{dec,2}w'_{dec,1}$ is 0 or 1, $w_{dec,n_W}w_{dec,n_W-1}L\ w_{dec,i}L\ w_{dec,2}w_{dec,1}$ respectively represent a value of the $(n_W)^{th}$ bit, a value of the $(n_W-1)^{th}$ bit, a value of the $(i)^{th}$ bit; . . . a value of the second bit and a value of the first bit of the if $W_{dec}$ each of the $w_{dec,n_W}w_{dec,n_W-1}L\ w_{dec,i}L\ w_{dec,2}w_{dec,1}$ is 0 or 1.

2. The 3D-HEVC inter-frame information hiding method based on visual perception, as recited in claim 1, wherein in the step (1H-b); through the $w'_{i'}$ and the $w'_{i'+1}$, the $QP_{org,j,k}$ is downwardly modulated to obtain the $QP'_{org,j,k}$, which comprises: (b1) finding out all values in an interval of $[-3,QP_{org,j,k}]$ which meet a condition that a remainder result of an absolute value of each of all the values to 4 is equal to $d_{i'}$; (b2) calculating an absolute value of a difference value of each of all the values found out in the step (b1) and the $QP_{org,j,k}$; and (b3) finding out a minimum absolute value of all absolute values calculated in the step (b2), and assigning a value found out in the step (b1), which is corresponding to the minimum absolute value, to the $QP'_{org,j,k}$;

in the step (1H-b), through rough the $w'_{i'}$ and the $w'_{i'+1}$, the $QP_{org,j,k}$ is upwardly modulated to obtain the $QP'_{org,j,k}$ which comprises: (b1') finding out all values in an interval of $[QP_{org,j,k},54]$ which meet a condition that a remainder result of an absolute value of each of all the values to 4 is equal to $d_{i'}$; (b2') calculating an absolute value of a difference value of each of all the values found out in the step (b1') and the $QP_{org,j,k}$; and (b3') finding out a minimum absolute value of all absolute values calculated in the step (b2'), and assigning a value found out in the step (b1'), which is corresponding to the minimum absolute value, to the $QP'_{org,j,k}$.

3. The 3D-HEVC inter-frame information hiding method based on visual perception, as recited in claim 1, wherein in the step (1H-c), through the $w'_{i'}$ and the $w^{i'+1}$, the $QP_{org,j,k}$ is downwardly modulated to regain the $QP'_{org,j,k}$, which comprises: (c1) finding out all values in an interval of $[0,QP_{org,j,k}]$ which meet a condition that a remainder result of an absolute value of each of all the values to 4 is equal to $d_{i'}$; (c2) calculating an absolute value of a difference value of each of all the values found out in the step (c1) and the $QP_{org,j,k}$; and (c3) finding out a minimum absolute value of all absolute values calculated in the step (c2), and assigning a value found out in the step (c1), which is corresponding to the minimum absolute value, to the $QP'_{org,j,k}$;

in the step (1H-c), through the $w'_{i'}$ and the $w'_{i'+1}$, the $QP_{org,j,k}$ is upwardly modulated to regain the $QP'_{org,j,k}$, which comprises: (c1') finding out all values in an interval of $[QP_{org,j,k},51]$ which meet a condition that a remainder result of an absolute value of each of all the values to 4 is equal to $d_{i'}$; (c2') calculating an absolute value of a difference value of each of all the values found out in the step (c1') and the $QP_{org,j,k}$; and (c3') finding out a minimum absolute value of all absolute values calculated in the step (c2'), and assigning a value found out in the step (c1'), which is corresponding to the minimum absolute value, to the $QP'_{org,j,k}$.

4. The 3D-HEVC inter-frame information hiding method based on visual perception, as recited in claim 2, wherein in the step (1H-c), through the $w'_{i'}$ and the $w'_{i'+1}$, the $QP_{org,j,k}$ is downwardly modulated to regain the $QP'_{org,j,k}$, which comprises: (c1) finding out all values in an interval of $[0,QP_{org,j,k}]$ which meet a condition that a remainder result of an absolute value of each of all the values to 4 is equal to $d_i$; (c2) calculating an absolute value of a difference value of each of all the values found out in the step (c1) and the $QP_{org,j,k}$; and (c3) finding out a minimum absolute value of all absolute values calculated in the step (c2), and assigning a value found out in the step (c1), which is corresponding to the minimum absolute value, to the $QP'_{org,j,k}$;

in the step (1H-c), through the $w'_i$, and the $w'_{i+1}$, the $QP_{org,j,k}$ is upwardly modulated to regain the $QP'_{org,j,k}$, which comprises: (c1') finding out values in an interval of $[QP_{org,j,k},51]$ which meets a condition that a remainder result of an absolute value of each of all the values to 4 is equal to $d_i$; calculating an absolute value of a difference value of each of all the values found out in the step (c1') and the $QP_{org,j,k}$; and (c3') finding out a minimum absolute value of all absolute values calculated in the step (c2'), and assigning a value found out in the step (c1'), which is corresponding to the minimum absolute value, to the $QP'_{org,j,k}$.

* * * * *